Dec. 9, 1947.  G. N. NICKELL  2,432,121
CABLE SERVING DEVICE
Filed April 16, 1945  2 Sheets-Sheet 1

INVENTOR.
GUY N. NICKELL
BY
Ralph Chappell
ATTORNEY.

Dec. 9, 1947.    G. N. NICKELL    2,432,121
CABLE SERVING DEVICE
Filed April 16, 1945    2 Sheets-Sheet 2
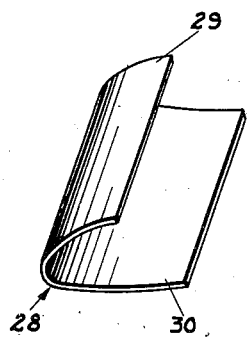
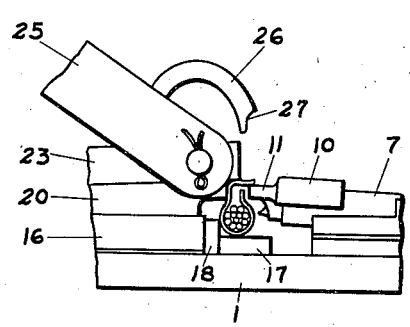
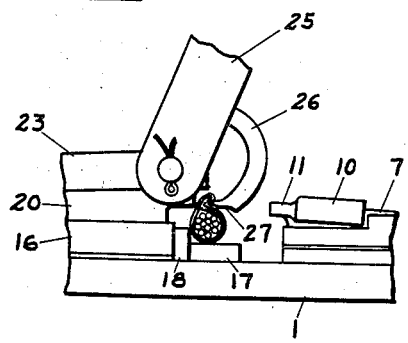
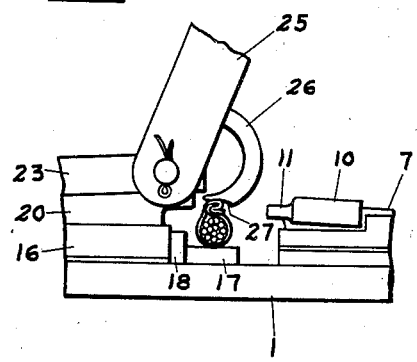
INVENTOR.
GUY N. NICKELL
BY
Ralph L. Chappell
ATTORNEY.

Patented Dec. 9, 1947

2,432,121

UNITED STATES PATENT OFFICE 2,432,121

CABLE SERVING DEVICE

Guy N. Nickell, Oakland, Calif.

Application April 16, 1945, Serial No. 588,512

3 Claims. (Cl. 153—1)

(Granted under the act of March 3, 1883, as amended April 30, 1928; 370 O. G. 757)

This invention relates to a cable serving device and more particularly to one for securing a metal serving to a wire cable in such a manner as to prepare the cable for cutting and prevent fraying of the cable ends after cutting.

When a wire cable is cut, it is desirable to secure some type of serving around the cut ends to prevent unraveling of the wires of the cable. A common method of providing such a serving is to apply the serving to the cable prior to the cutting operation at the location in which the cut is to be made. The cable is then cut through the serving and both cut ends are thus equipped with a suitable serving.

The apparatus of my invention enables an operator to apply a serving of the type described to a cable, without the necessity of using any type of prefabricated serving. It is possible to employ as a serving any thin sheet of formable material cut to the proper dimensions.

It is therefore an object of my invention to provide a cable serving device which enables an operator to apply a serving to a cable easily and without the use of special prefabricated servings.

It is a further object of my invention to provide a cable serving device with which the cable serving is secured tightly to the cable in such manner that there is no danger of slippage.

Other objects of the invention are to provide for applying a serving to a cable in a facile, economical and efficient manner.

The manner in which I have accomplished these and other objects of the invention will become apparent upon a study of the specification which follows and the drawing wherein:

Fig. 3 is a perspective view of a sheet ready to be applied to a cable and to be secured thereon as a serving by use of my device.

Fig. 4 is a side elevational view of the operative parts of my device in the first step of securing a serving to a cable.

Fig. 5 is a side elevational view of the operative parts of my device in the second step of securing a serving to a cable.

Fig. 6 is a side elevational view of the operative parts of my device in the third step of securing a serving to a cable.

Fig. 7 shows a cable length to which servings have been secured by use of my device.

Figure 1:
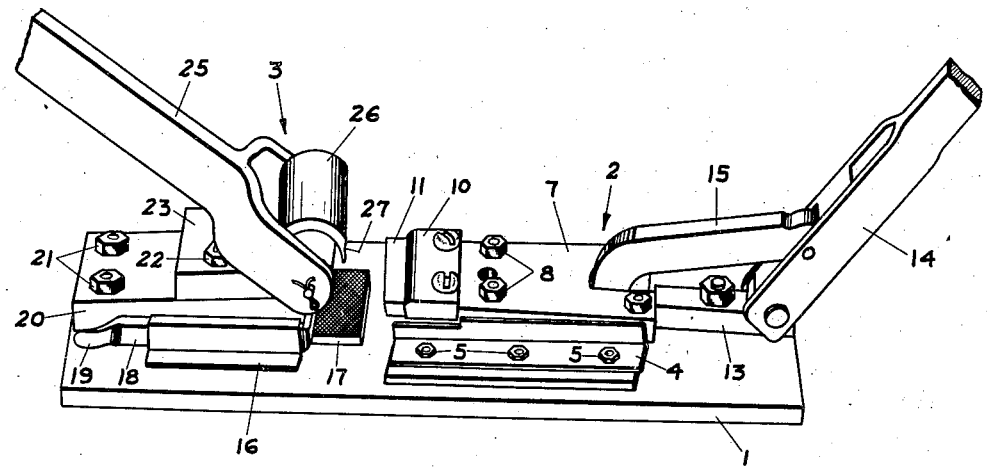
Fig. 1 is a perspective view of the cable serving device of my invention.

Referring more in detail to the drawings:

The cable serving device comprises a base 1, Fig. 1. At one end of the base 1 is mounted a first crimping means, designated generally as 2. At the other end of the base 1 is mounted a second crimping means, designated generally as 3.

The first crimping means 2 comprises a pair of opposed guides 4 rigidly secured to the base as by the bolts 5 illustrated. Mounted to slide within the guides 4 is a guide plate 6, Fig. 2. A first crimping plate 7 is adjustably secured to the guide plate 6 by means of the bolts 8 and the set screw 9, Fig. 2. The first crimping plate 7 may be adjusted vertically with respect to the guide plate 6 by loosening the nuts on the bolts 8 and turning the set screw 9 up or down.

Removably secured to the inner end of the first crimping plate 7 is a crimping plunger 10. Different sizes of crimping plunger 10 may be secured to the first crimping plate 7 in order to apply servings to different sizes of cable. The crimping plunger 10 has a projecting portion 11 adapted to be engaged with the serving and, cooperating with elements of the second crimping means 3, to place the first crimp in the serving and has projecting prongs 12, Fig. 2, adapted to grip the serving as it is being applied to the cable.

A first handle base 13 is rigidly secured to the base 1 adjacent the outer ends of the guides 4. A first handle 14 is pivoted to the outer end of the handle base 13. The inner end of the handle base 13 acts as a stop to limit outward movement of the guide plate 6 and first crimping plate 7. The first handle 14 is connected to the first crimping plate 7 by the link 15 in such manner that pivoting of the first handle on the handle base slides the guide plate 6, the first crimping plate 7, and the crimping plunger 10 longitudinally of the base.

The second crimping means 3 comprises a pair of opposed guides 16 rigidly secured to the base. Mounted between the guides 16 is a plate 17 which extends inwardly of the guides and has its upper surface roughened in the space between the first crimping means and second crimping means.

A U-shaped cable stabilizer 18 is mounted to slide within the guides 16 above the plate 17. The bight of the U-portion is located where it may be moved into the space between the two crimping means. One of the arms of the stabilizer is provided with a finger grip 19 to enable an operator to project the stabilizer into the space between the crimping means when needed.

A second crimping plate 20 is secured to the base within the guide member 16 and above the plate 17 by means of the bolts 21 and 22. A second handle base 23 is secured to the top of the second crimping plate 20 by means of the bolts 22, which extend through the base 1, the plate 17, the second crimping plate 20 and the handle base 23.

Figure 2:
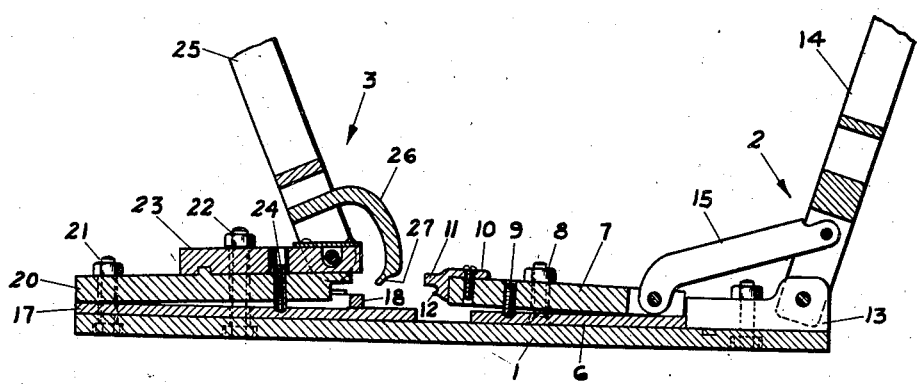
Fig. 2 is a longitudinal vertical sectional view of the cable serving device.

The second handle base 23 is relatively fixed with respect to the second crimping plate 20, but the second crimping plate 20 may be adjusted vertically with respect to the base 1 and plate 17 by means of the set screw 24, Fig. 2.

A second handle 25 is pivoted to the second handle base 23 adjacent the inner end thereof. The second handle 25 has a crimping jaw 26 integral with the lower portion thereof. The lower end 27 of the crimping jaw 26 is tapered with the outer surface being concave to fit easily over a cable. The crimping jaw 26 extends from the lower portion of the handle into the space between the two crimping means in such manner that the lower end may cooperate with the second crimping plate 20 to place crimps in a cable serving.

Operation

When it is desired to secure a serving to a cable, a sheet of suitable formable material is cut to the appropriate dimensions. The length may be varied as desired to produce a serving of desired length, but the width is a function of the diameter of the cable. For example, I have found that for a cable of one-fourth inch diameter a sheet having a width of one and one-half inches forms a suitable serving. The appropriate width of sheet for other sizes of cable may be likewise determined.

The sheet, designated as 28, is first bent manually or otherwise to U-shape with a shorter leg 29 and a longer leg 30 as shown in Fig. 3. The shorter leg 29 of the sheet is of such length that when it is placed around a cable and fitted in the device between the two crimping means 2 and 3, it reaches to the top of the projecting portion 11 on the crimping plunger 10.

The bent sheet is next applied to the cable at the proper location and bent again manually until the two legs are parallel, as shown in Fig. 4.

The cable with the partially formed serving applied in this manner is placed within the device between the two crimping means so that the shorter leg is adjacent the projecting portion 11 of the crimping plunger 10, as shown in Fig. 4.

The cable stabilizer 18 is projected inwardly by manually forcing the finger grip 19 thereof to the right, Fig. 1, in such a manner that the bight of the U-portion bears against the longer leg 30 of the cable serving. The first handle 14 is then pivoted inwardly, thus sliding the crimping plunger 10 and associated mechanism inwardly. At the same time manual pressure on the cable stabilizer, finger grip is gradually released so that the cable stabilizer moves outwardly, or back to the left, Fig. 1. In this way, the cable and serving are controlled and do not become displaced from desired position relative to the crimping plunger.

The first step in the operation of the apparatus is illustrated in Fig. 4. The projecting portion 11 of the crimping plunger 10 engages the shorter leg 29 of the serving and bends it inwardly or to the left relative to Fig. 4. At the same time the longer leg 30 of the cable serving is engaged by the inner end of the second crimping plate 20, and the projecting lower face of the second handle base 23. The upper portion of the longer leg is thus bent down over the upper edge of the shorter leg of the serving.

The function of the cable stabilizer 18 in this operation is to hold the cable and cable serving against rotation when the crimping plunger is moved inwardly. The roughened surface on the plate 17 also assists in performing this function.

After a crimp of the type illustrated in Fig. 4 has been placed in the serving, the crimping plunger 10 is retracted by moving the first handle 14 outwardly, or to the right relative to the drawings.

The second step in the operation is illustrated in Fig. 5. In this step the handle 25 is pivoted inwardly, i. e., to the right. The lower end 27 of the crimping jaw engages the portion of the longer leg 30 of the serving where it is bent over the shorter leg 29 and bends it down against the shorter leg and, cooperating with the second crimping plate 20, starts to bend it over against the cable.

The second handle 25 is then pivoted outwardly thus raising the crimping jaw 26. The cable with the partially applied serving is then manually turned slightly and the handle 25 is again pivoted inwardly. The crimping jaw 26 and especially the concave portion of the lower end 27 thereof engages the folded surface of the serving and bends it down flat against the cable. This third step in the operation is illustrated in Fig. 6.

Fig. 7 shows a length of cable 31 with servings applied. The completed serving 32 has been applied and is ready to be cut if desired. The cut ends of the cable are protected by the serving portions 33 and 34, through which the cuts have been made.

When it is desired to use the serving device for a different size of cable, the nuts on the bolts 8, 21 and 22 are loosened and the set screws 9 and 24 are adjusted to move crimping plates 7 and 20 the appropriate distance vertically with respect to the base. When proper adjustment has been attained, the nuts on the bolts 8, 21 and 22 are again tightened. The crimping plunger 10 may be replaced with another crimping plunger of suitable size.

I have shown but one embodiment of my invention. However, it will be apparent to those skilled in the art that the device is susceptible to numerous modifications without departing from the spirit of the invention. Therefore, I do not wish to be limited by the disclosure set forth hereinabove but only by the scope of the appended claims.

The invention described herein may be manufactured and used by or for the Government of the United States of America for governmental purposes without the payment of any royalties thereon or therefor.

I claim:

1. A cable serving device comprising a base, a first guide means secured to said base, a guide plate slidably mounted in said first guide means, a first crimping plate adjustably secured to said guide plate, a crimping plunger secured to said crimping plate adjacent the inner end thereof, a first handle pivoted to said base, a link pivoted at one end to said first handle and pivoted at the other end to said first crimping plate whereby pivotal movement of the first handle causes said guide plate, said first crimping plate and said crimping plunger to slide in said first guide means, a second guide means secured to said base, a U-shaped cable stabilizer slidably mounted in said second guide means, a second crimping plate adjustably secured to said base within the U-portion of said cable stabilizer and being cooperable with said crimping plunger to make a first crimp in a cable serving, a handle plate secured to said second crimping plate, a second handle pivoted to said handle plate, and a crimping jaw fixed to said second handle and being cooperable with said second crimping plate to make second and third crimps in a cable serving.

2. A cable serving device comprising a base, a first guide means secured to said base, means slidably mounted in said first guide means and carrying a crimping plunger, a first handle pivoted to said base, a linkage connecting said first handle and said slidably mounted means whereby pivotal movement of the first handle causes said slidably mounted means and said crimping plunger to slide in said first guide means, a second guide means secured to said base, a U-shaped cable stabilizer slidably mounted in said second guide means, means mounted within the U portion of said cable stabilizer cooperable with said crimping plunger to make a first crimp in a cable serving, a second handle pivoted to said last named means, and a crimping jaw fixed to said second handle and being cooperable with said last named means to make second and third crimps in a cable serving.

3. A cable serving device comprising a base, means slidably mounted on said base and carrying a crimping plunger, a first handle pivoted to said base and operatively connected to said means whereby pivotal movement of said first handle causes said means and said crimping plunger to slide along the base, means cooperable with said crimping plunger to make a first crimp in a cable serving, a second handle pivoted to said last named means, and a crimping jaw fixed to said second handle and being cooperable with said last named means to make second and third crimps in a cable serving.

GUY N. NICKELL.

REFERENCES CITED

The following references are of record in the file of this patent:

UNITED STATES PATENTS

| Number | Name | Date |
| --- | --- | --- |
| 46,311 | Valentine et al. | Feb. 7, 1865 |
| 402,133 | Betts | Apr. 30, 1889 |
| 1,111,403 | Ohl | Sept. 22, 1914 |
| 1,474,882 | Baumgarten | Nov. 20, 1923 |